H. S. DEAN.
APPARATUS FOR PACKING OR STUFFING ARTICLES.
APPLICATION FILED AUG. 19, 1911.
1,022,305.
Patented Apr. 2, 1912.
2 SHEETS—SHEET 2.
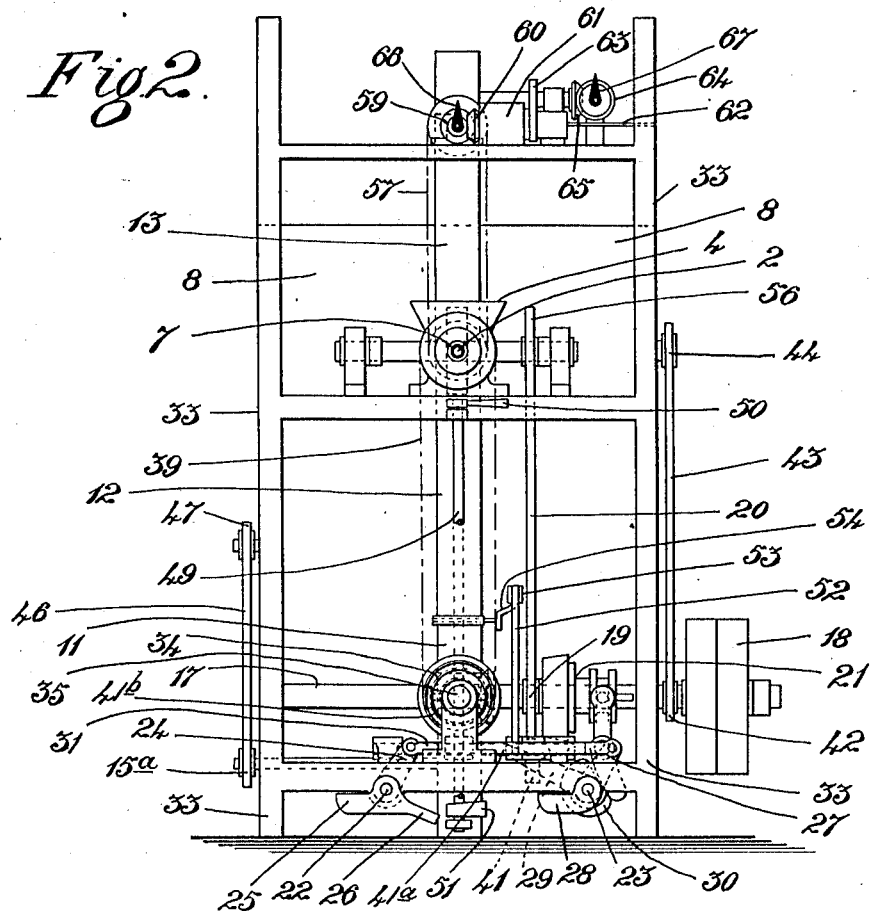
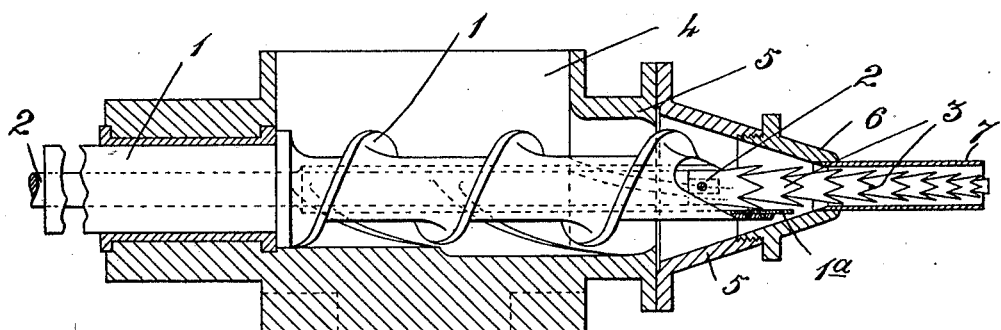
Witnesses:
Inventor
Henry S. Dean
by James L. Norris, Jr.
Atty.

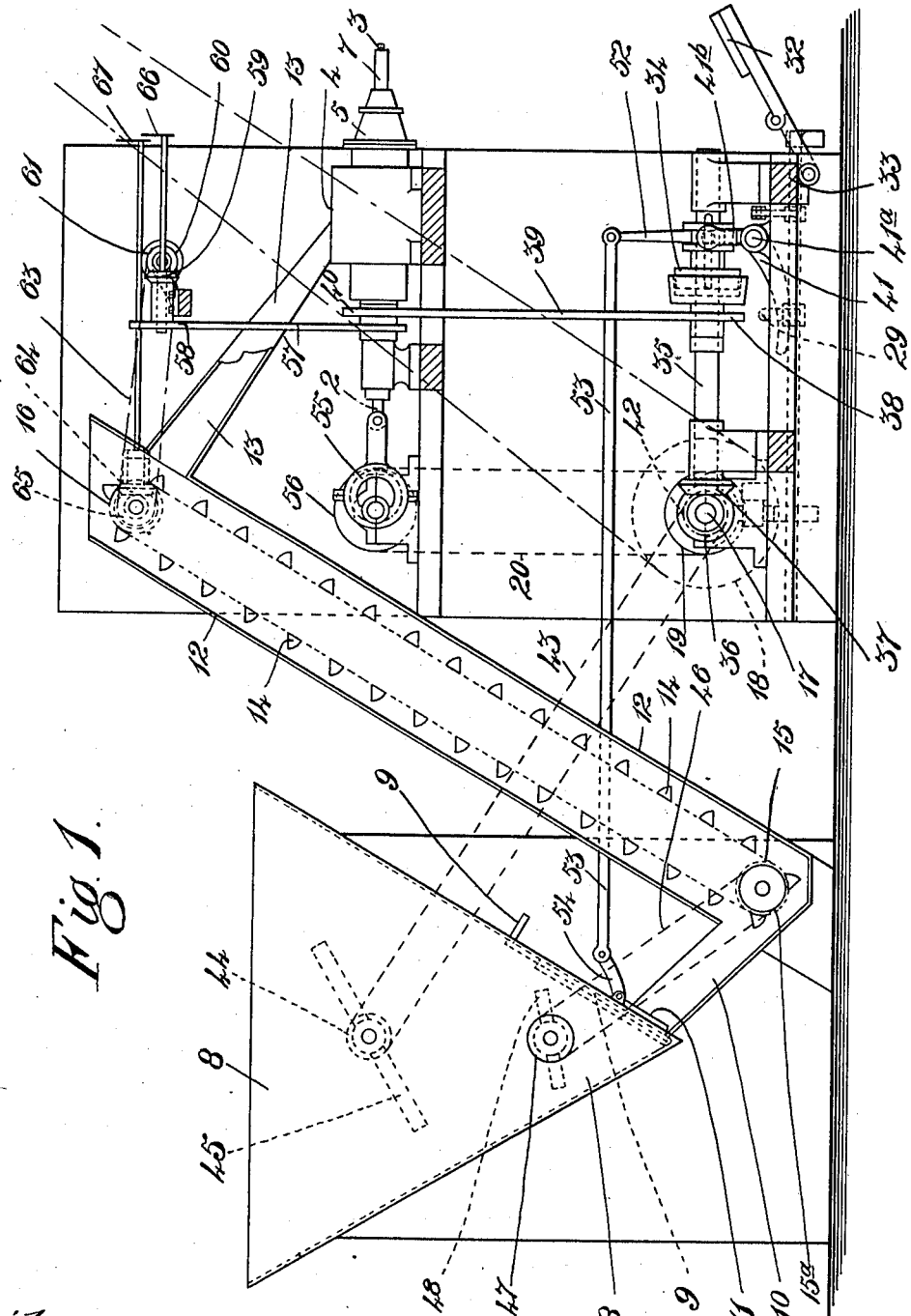

UNITED STATES PATENT OFFICE.

HENRY SAMUEL DEAN, OF LONDON, ENGLAND.

APPARATUS FOR PACKING OR STUFFING ARTICLES.

1,022,305. Specification of Letters Patent. Patented Apr. 2, 1912.

Application filed August 19, 1911. Serial No. 645,048.

*To all whom it may concern:*

Be it known that I, HENRY SAMUEL DEAN, a subject of the King of Great Britain, residing at London, England, have invented certain new and useful Improvements in Apparatus for Packing or Stuffing Articles, of which the following is a specification.

The object of this invention is to construct an apparatus for mechanically stuffing or packing articles, wherein the operator simply positions and holds the carcass or frame to the machine, thereby effecting a great saving in time and cost of labor, besides insuring an even stuffing throughout the article.

The invention will be clearly understood from the following description, aided by the annexed drawings, in which—

Figure 1 is a side elevation of the machine; Fig. 2 is a front elevation; and Fig. 3 is a side sectional elevation of the feeder and stuffer which forms the principal part of the invention.

For the purpose of the invention, the appliance for feeding or stuffing or forcing the material into the frame, or carcass, or the like, to be stuffed or packed, will first be described. This appliance practically consists of a hollow Archimedean screw 1 for feeding the material, and a reciprocating plunger 2 positioned within the bore of the screw 1, said plunger having barbs, ribs, or their equivalent, 3 at its outer end, which end may be made detachable from the plunger rod. These two appliances are arranged in a box 4, or its equivalent, having a tubular extension 5, that is preferably, though not necessarily, provided with a nozzle 6 to which a tube 7 is connected, the barbed portion 3 of the plunger 2 being positioned in the nozzle and tube, so that, in action, the screw 1 will move the material in box 4 toward the barbed end of the plunger and the reciprocation of the latter will allow the barbs 3 to push the material down the tube 7 into the article which is attached or held on or to the tube by hand or otherwise.

The nozzle 6, barbed end 3 and tube 7 are of various sizes, and can be readily attached to the extension 5 and the plunger 2 to suit the size of the article to be stuffed and the amount of material to be delivered, and the nose of the screw may have a plow or strip 1ª at the end, to stir the material and prevent it from blocking at the entrance of tube 7.

The complete apparatus comprises a hopper 8 into which is placed the material to be employed for stuffing the articles, and such material may be granulated cork, cork-dust, sawdust, or any suitable substance.

At the base of the hopper 8, there is provided an opening, closable by a sliding door 9, through which the material remaining in the hopper and not required can be removed, and there is also provided an opening leading into a chute 10, such opening being closable by a valve 11 connected with the operating mechanism, as hereafter described. From the bottom of the chute 10 extends an upwardly-inclined chute 12 leading at its top into another downwardly inclined chute 13 which leads, in turn, to the box 4.

Inside the chute 12 there is disposed an endless chain of buckets 14, which travel over pulleys 15, 16, the lower pulley 15 being positioned at the bottom of the chute 12, while the upper pulley 16 is positioned just above the opening of the chute 13. Chute 12 is inclined toward chute 13, so that the material brought up in the chute 12 by the buckets 14 will be emptied into the chute 13. Instead of buckets, a screw, or any other means for conveying the material from the hopper 8 to the chute 13 into the box 4, may be employed.

At the base of and across the apparatus is arranged a shaft 17, which carries fast and loose pulleys 18 operated by a belt from some prime mover. This shaft 17 also carries a loose pulley 19 connected by a belt 20 with a pulley hereafter described, pulley 19 being driven through the agency of a clutch mechanism 21 that is provided upon said shaft. In front of and below shaft 17 are arranged two shafts 22, 23, and on the shaft 22 are fixed two levers 24, 25, the last-mentioned lever having an extension 26; on the shaft 23 are fixed three levers 27, 28, 29, and, also, a cam 30, the two levers 24 and 27 being connected by a bar 31 so that all the levers and the two shafts are caused to move in unison. On the levers 25 and 28 is fixed a foot pedal 32, (not shown in Fig. 2), this pedal being pivoted to the frame 33 which carries all the mechanism. The cam 30 is positioned in line with the clutch mechanism 21 for operating same, and the lever 29 is positioned to operate a clutch mechanism 34 on a shaft 35 located at right angles to the shaft 17, the two shafts 17 and 35 being connected by intermeshing bevel gears 36 and 37. Shaft 35 also carries a pulley 38 which is connected with a pulley 40 on the screw 1 by a driving belt 39. The lever 29 controls one end of an arm 41 secured laterally to a rock shaft 41$^a$ which is mounted in the frame and is provided with a forked arm 41$^b$ that engages the movable member of clutch 34. The shaft 17 also carries a pulley 42 connected by belt 43 with a pulley 44 in the hopper 8, the shaft of which pulley carries stirring arms 45. The pulley 15$^a$ is connected by belt 46 with a pulley 47 in the lower part of the hopper, this pulley 47 having arms 48 which also act as stirrers. At the side of and above the lever 26 is positioned a rod 49 having a handle 50 at its upper end and a wiper 51 at its lower end, so that when the pedal action is not required and the machine is to be kept running, the wiper may be moved under the lever 26 to hold the entire clutch mechanism in gear. On the rock shaft 41$^a$ is fixed an arm 52, connected by a rod 53 to the arm 54 of the pivoted valve 11, to operate same, as hereafter described.

Above the clutch and lever mechanism are positioned the box 4 and the screw and plunger, the shaft of the screw 1 being provided with the aforedescribed pulley 40, which is connected by the belt 39 with the pulley 38. The plunger rod 2 is reciprocated by means of an eccentric 55, which is connected therewith and is mounted on the shaft of a pulley 56, said pulley 56 being driven by belt 20 from a pulley 19 on shaft 17. From the pulley 40, or another pulley on the screw 1, is run a belt 57, connected with a pulley 58 whose shaft carries a bevel gear 59 that meshes with a bevel pinion 60 included in a change-speed gear 61, which latter is operable by a cord 62 to alter the speed. The change-speed gear 61 further includes a pulley connected by a belt 63 with a bevel gear 64 in mesh with a bevel gear 65 on the shaft of pulley 16 that carries the chain of buckets 24, to rotate same. 66, 67, are fingers on the shafts of the gears 59 and 64 to indicate the working of the machine.

In action, the operator first places the mouth of the article to be stuffed over the tube 7 and holds it there; he then presses the treadle 32 and thus depresses the levers 25 and 28, causing the cam 30 to first engage the clutch mechanism 21, for operating the reciprocating plunger; the continued downward movement of the pedal actuates the lever 29, said lever being caused to engage and depress arm 41 and thereby couple the members of the clutch mechanism 34 and shift the rod 53 endwise, to open valve 11; these actions set the various gear mechanisms in motion and effect the rotation of the eccentric 55 for operating the plunger 2. The material is carried up by the buckets 14, dropped into the chute 13, and thence fed to the box 4, where it is conveyed by the screw 1 to the barbed portion 3 of plunger 2, the barbs or projections pushing it into the article until the latter is full; the operator can then release the pedal and stop the machine. When only a small quantity of material is required and it is not necessary to feed more material to the box, the plunger only need be put into operation, or said plunger can be operated to act as a hammer to further press and tighten or pack the material in the article.

Reference has been made hereinabove to pulleys and bands, but it will be understood that sprockets and chains may be employed with equal facility.

I claim as my invention:

1. In an apparatus for packing or stuffing articles, the combination of a casing having an outlet; a hollow rotary member arranged within said casing for feeding material toward said outlet; a reciprocatory member arranged within the bore of said rotary member and projecting through the outer end thereof; and separate means for operating said rotary and reciprocatory members.

2. In an apparatus for packing or stuffing articles, the combination of a casing having a tubular extension provided with a nozzle; a hollow feed screw arranged within said casing and projecting into said extension; a plunger arranged in the bore of said screw and projecting through the outer end thereof; means for rotating said screw; and means for reciprocating said plunger.

3. In an apparatus for packing or stuffing articles, the combination of a casing having an outlet; a hollow rotary member arranged within said casing for feeding material toward said outlet; a reciprocatory member arranged within the bore of said rotary member and having a barbed end projecting through the outer end thereof; and separate means for operating said rotary and reciprocatory members.

In testimony whereof I have hereunto set my hand in presence of two subscribing witnesses.

HENRY SAMUEL DEAN.

Witnesses:
L. R. AMIREY,
WM. O. BROWN.

Copies of this patent may be obtained for five cents each, by addressing the "Commissioner of Patents, Washington, D. C."